(12) United States Patent  
Gogic et al.

(10) Patent No.: US 8,838,096 B2
(45) Date of Patent: Sep. 16, 2014

(54) NON-MACRO CELL SEARCH INTEGRATED WITH MACRO-CELLULAR RF CARRIER MONITORING

(75) Inventors: Aleksandar M. Gogic, San Diego, CA (US); Roland R. Rick, Superior, CO (US); Serguei A. Glazko, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 12/475,188

(22) Filed: May 29, 2009

(65) Prior Publication Data

US 2010/0304741 A1 Dec. 2, 2010

(51) Int. Cl.
*H04W 4/00* (2009.01)
*H04W 48/16* (2009.01)
*H04W 68/00* (2009.01)
*H04W 16/32* (2009.01)

(52) U.S. Cl.
CPC .............. *H04W 48/16* (2013.01); *H04W 68/00* (2013.01); *H04W 16/32* (2013.01)
USPC ........................... 455/434; 455/574; 370/311

(58) Field of Classification Search
USPC .................... 455/434, 574; 370/311
See application file for complete search history.

(56) References Cited

U.S. PATENT DOCUMENTS

| | | | |
|---|---|---|---|
| 4,707,841 A | 11/1987 | Yen et al. | |
| 5,093,926 A | 3/1992 | Sasuta | |
| 5,640,677 A | 6/1997 | Karlsson | |
| 5,896,573 A | 4/1999 | Yang et al. | |
| 5,983,097 A | 11/1999 | Kakinuma et al. | |
| 6,031,829 A | 2/2000 | Dupuy et al. | |
| 6,167,268 A | 12/2000 | Souissi et al. | |
| 6,529,491 B1 | 3/2003 | Chang et al. | |
| 6,539,491 B1 | 3/2003 | Skergan et al. | |
| 6,590,881 B1 | 7/2003 | Wallace et al. | |
| 6,621,811 B1 | 9/2003 | Chang et al. | |
| 6,956,527 B2 | 10/2005 | Rogers et al. | |
| 6,983,156 B2 | 1/2006 | Fukushima et al. | |

(Continued)

FOREIGN PATENT DOCUMENTS

| CN | 1129509 A | 8/1996 |
|---|---|---|
| CN | 1207859 A | 2/1999 |

(Continued)

OTHER PUBLICATIONS

International Search Report and the Written Opinion, PCT/US2009/052499, International Searching Authority, European Patent Office, Mar. 12, 2010.

(Continued)

*Primary Examiner* — Ajit Patel

(57) ABSTRACT

Embodiments include access terminals, computer readable media, and wireless communication systems. These sample a wireless spectrum portion that includes macro cell carrier and at least one other target carrier where non-macro cells are deployed, using a receive chain, a signal processor, and a controller. The wireless spectrum portion is processed to resolve portions corresponding to macro cell carrier and at least one additional carrier where target non-macro cells are deployed. The processed signal is searched for at least one target non-macro cell pilot and the macro carrier portion is used for a paging monitoring operation.

26 Claims, 11 Drawing Sheets

(56) References Cited

U.S. PATENT DOCUMENTS

| | | | |
|---|---|---|---|
| 6,999,778 B2 | 2/2006 | DiBuduo | |
| 7,020,111 B2 * | 3/2006 | Ozluturk et al. | |
| 7,054,627 B1 | 5/2006 | Hillman | |
| 7,254,407 B2 | 8/2007 | Bokish | |
| 7,263,370 B1 | 8/2007 | Infosino | |
| 7,289,541 B2 | 10/2007 | Elam | |
| 7,319,878 B2 | 1/2008 | Sheynblat et al. | |
| 7,340,278 B2 | 3/2008 | Nakada | |
| 7,346,321 B2 | 3/2008 | Backes | |
| 7,395,074 B2 | 7/2008 | Syrjarinne | |
| 7,433,694 B2 | 10/2008 | Morgan et al. | |
| 7,477,920 B2 | 1/2009 | Scheinert et al. | |
| 7,715,471 B2 | 5/2010 | Werner et al. | |
| 7,840,985 B2 | 11/2010 | MacInnis | |
| 8,045,638 B2 | 10/2011 | Grant et al. | |
| 8,169,982 B2 | 5/2012 | Gogic et al. | |
| 2002/0082044 A1 | 6/2002 | Davenport | |
| 2003/0022686 A1 | 1/2003 | Soomro et al. | |
| 2003/0048758 A1 | 3/2003 | Jones et al. | |
| 2003/0118015 A1 | 6/2003 | Gunnarsson et al. | |
| 2003/0144006 A1 | 7/2003 | Johansson et al. | |
| 2003/0214937 A1 * | 11/2003 | Lindoff et al. | |
| 2004/0071119 A1 | 4/2004 | Ishikawa et al. | |
| 2004/0147232 A1 | 7/2004 | Zodnik | |
| 2004/0162084 A1 | 8/2004 | Wang | |
| 2004/0166886 A1 | 8/2004 | Laroia et al. | |
| 2005/0009521 A1 | 1/2005 | Preece | |
| 2005/0018597 A1 | 1/2005 | Yuda et al. | |
| 2005/0037775 A1 | 2/2005 | Moeglein et al. | |
| 2005/0078033 A1 | 4/2005 | Tamaki et al. | |
| 2005/0227689 A1 | 10/2005 | Jewett | |
| 2005/0246334 A1 | 11/2005 | Tao et al. | |
| 2005/0250496 A1 | 11/2005 | Hason et al. | |
| 2005/0272444 A1 | 12/2005 | Heffield et al. | |
| 2006/0016850 A1 | 1/2006 | Yoshie | |
| 2006/0045134 A1 | 3/2006 | Eldon et al. | |
| 2006/0052067 A1 | 3/2006 | Singh et al. | |
| 2006/0148486 A1 | 7/2006 | Kim et al. | |
| 2006/0234739 A1 | 10/2006 | Thadasina et al. | |
| 2007/0002813 A1 | 1/2007 | Tenny et al. | |
| 2007/0004428 A1 | 1/2007 | Morgan et al. | |
| 2007/0019586 A1 | 1/2007 | Nanda et al. | |
| 2007/0030956 A1 | 2/2007 | Hornig | |
| 2007/0097939 A1 | 5/2007 | Nylander et al. | |
| 2007/0105527 A1 | 5/2007 | Nylander et al. | |
| 2007/0121560 A1 | 5/2007 | Edge | |
| 2007/0178914 A1 | 8/2007 | Montenegro | |
| 2007/0184185 A1 | 8/2007 | Besinger et al. | |
| 2007/0184845 A1 | 8/2007 | Troncoso | |
| 2007/0238448 A1 | 10/2007 | Gallagher et al. | |
| 2008/0153533 A1 | 6/2008 | Claussen et al. | |
| 2009/0034501 A1 * | 2/2009 | Hahm et al. | |
| 2009/0061821 A1 | 3/2009 | Chen et al. | |
| 2009/0092111 A1 | 4/2009 | Horn et al. | |
| 2009/0098873 A1 | 4/2009 | Gogic | |
| 2009/0098885 A1 | 4/2009 | Gogic et al. | |
| 2009/0122773 A1 | 5/2009 | Gogic | |
| 2009/0156165 A1 | 6/2009 | Raghothaman et al. | |
| 2009/0163227 A1 | 6/2009 | Collins | |
| 2009/0221287 A1 | 9/2009 | Balasubramanian et al. | |
| 2010/0054206 A1 | 3/2010 | Kalhan | |
| 2010/0056177 A1 | 3/2010 | Kojima | |
| 2010/0069066 A1 | 3/2010 | Shen et al. | |
| 2010/0120394 A1 | 5/2010 | Mia et al. | |
| 2010/0130212 A1 | 5/2010 | So et al. | |
| 2010/0178916 A1 | 7/2010 | Jamadagni | |
| 2010/0240397 A1 | 9/2010 | Buchmayer et al. | |
| 2010/0246529 A1 | 9/2010 | Ishizu et al. | |
| 2010/0260052 A1 * | 10/2010 | Cho et al. | |
| 2010/0329206 A1 | 12/2010 | Thome et al. | |
| 2011/0105128 A1 | 5/2011 | Narasimha | |
| 2011/0130115 A1 | 6/2011 | Venkatachalam | |
| 2011/0134833 A1 | 6/2011 | Gogic | |
| 2011/0170481 A1 | 7/2011 | Gomes et al. | |
| 2011/0205932 A1 | 8/2011 | Ekici et al. | |
| 2012/0015649 A1 | 1/2012 | Li et al. | |
| 2012/0106349 A1 | 5/2012 | Adjakple et al. | |
| 2012/0108199 A1 | 5/2012 | Wang et al. | |
| 2012/0122492 A1 | 5/2012 | Zhou et al. | |
| 2012/0142362 A1 | 6/2012 | Mori | |
| 2012/0220310 A1 | 8/2012 | Gogic et al. | |

FOREIGN PATENT DOCUMENTS

| | | |
|---|---|---|
| CN | 1894979 A | 1/2007 |
| EP | 0865172 A2 | 9/1998 |
| EP | 0973271 A1 | 1/2000 |
| EP | 1037482 A2 | 9/2000 |
| EP | 1119137 A1 | 7/2001 |
| EP | 1298847 A1 | 4/2003 |
| EP | 1365613 A1 | 11/2003 |
| EP | 1739881 A1 | 1/2007 |
| EP | 1848125 | 10/2007 |
| EP | 2073163 A1 | 6/2009 |
| GB | 2313257 A | 11/1997 |
| GB | 2389005 | 11/2003 |
| GB | 2398970 | 9/2004 |
| GB | 2446847 A | 8/2008 |
| JP | 10221425 A | 8/1998 |
| JP | 2003506960 A | 2/2003 |
| JP | 2003519995 T | 6/2003 |
| JP | 2004297121 A | 10/2004 |
| JP | 2004320473 A | 11/2004 |
| JP | 2004535575 T | 11/2004 |
| JP | 2005509136 A | 4/2005 |
| JP | 2005123662 A | 5/2005 |
| JP | 2006074468 A | 3/2006 |
| JP | 2006508603 A | 3/2006 |
| JP | 2006186551 A | 7/2006 |
| JP | 2007520146 A | 7/2007 |
| JP | 2009504018 A | 1/2009 |
| JP | 2009504019 A | 1/2009 |
| JP | 2009510973 A | 3/2009 |
| JP | 2010074779 A | 4/2010 |
| JP | 2010081118 A | 4/2010 |
| KR | 20080079946 A | 9/2008 |
| RU | 2113772 C1 | 6/1998 |
| RU | 2197780 C2 | 1/2003 |
| RU | 2296436 C2 | 3/2007 |
| RU | 2007134181 A | 3/2009 |
| RU | 2360378 C1 | 6/2009 |
| WO | WO2004052041 | 6/1720 |
| WO | WO9501706 A1 | 1/1995 |
| WO | WO9913743 A1 | 4/1999 |
| WO | WO0075684 A1 | 12/2000 |
| WO | WO0111804 A1 | 2/2001 |
| WO | WO0115340 A1 | 3/2001 |
| WO | WO-0239759 A2 | 5/2002 |
| WO | 02082832 | 10/2002 |
| WO | WO03001687 A2 | 1/2003 |
| WO | WO-03010552 A2 | 2/2003 |
| WO | WO03081939 A1 | 10/2003 |
| WO | WO03100647 A1 | 12/2003 |
| WO | WO03101138 A1 | 12/2003 |
| WO | WO2004051887 A2 | 6/2004 |
| WO | WO2004077753 | 9/2004 |
| WO | WO-2005036836 A1 | 4/2005 |
| WO | WO2005039214 A1 | 4/2005 |
| WO | WO2005057834 A2 | 6/2005 |
| WO | WO-2005076656 A1 | 8/2005 |
| WO | WO2005088991 A1 | 9/2005 |
| WO | WO2007022005 | 2/2007 |
| WO | 2007040449 A1 | 4/2007 |
| WO | WO2007040454 A2 | 4/2007 |
| WO | WO2007112559 A1 | 10/2007 |
| WO | WO2008030956 | 3/2008 |
| WO | 2008055251 | 5/2008 |
| WO | WO2008076222 | 6/2008 |
| WO | WO2008109842 | 9/2008 |
| WO | WO2008131588 | 11/2008 |
| WO | WO2008131591 | 11/2008 |
| WO | WO2008136416 | 11/2008 |

(56) References Cited

FOREIGN PATENT DOCUMENTS

| WO | WO-2009108811 A1 | 9/2009 |
| WO | WO-2009116427 A1 | 9/2009 |
| WO | WO2009120902 A1 | 10/2009 |

OTHER PUBLICATIONS

Bender, P., et al., "CDMA/HDR: A Bandwidth-Efficient Hirth-speed Wireless Data Service for Nomadic Users" IEEE Communications Magazine, IEEE Service.
Center, Piscataway, US, vol. 38. No. 7, Jul. 1, 2000, pp. 70-77, XP010091318.
Dimitri Rubin and Todd Young: "Femtocells Bridging Reliable Location and Timing Indoors" Insidegnss, vol. 3, No.7, 2008, pp. 40-46, XP002520000 the whole document.
EE624 Mobile Communications Systems (MCS) in: Spread Spectrum Systems, Communication Networks Research Lab, (Fall 2000).
3GPP TS 25.133 vol. 8.10.0 (Mar. 2010), 3rd Generation Partnership Project; Technical Specification Group Radio Access Network; Requirements for support of radio resource management (FDD) (Release 8), 236 pp.
Taiwan Search Report—TW098125917—TIPO—Feb. 25, 2013.
Universal Mobile Telecommunications, System (UMTS); Radio Resource Control, (RRC); Protocol specification (3GPP TS 25.331 version 9.1.0 Release 9), Technical Specification, European Telecommunications Standards Institute (ETSI), 650, Route des Lucioles; F-06921 Sophia-Antipolis; France, vol. 3GPP RAN 2, No. vol. 9.1.0, Feb. 1, 2010, XP014046584, p. 461-467 p. 1684-1685, paragraph 14.7a p. 1688, paragraph 14.11.1—p. 1690, paragraph 14.11.2.

* cited by examiner

NON-MACRO CELL SEARCH INTEGRATED WITH MACRO-CELLULAR RF CARRIER MONITORING

BACKGROUND

1. Field

The present disclosure relates generally to wireless communications and more specifically to methods and systems that permit use of non-macro cells within macro-cellular networks with low power consumption incurred by the mobile device.

2. Background

Wireless communication systems are widely deployed to provide various types of communication (e.g. voice, data, multimedia, etc.) to multiple users. Increasing demand for high-rate data services has prompted wireless service providers to develop higher speed communications networks that maintain efficient and robust performance. Competition among wireless service providers and increased user demand has also motivated service providers to provide reliable and enhanced service at low prices.

In response, wireless providers are introducing user-connectable network improvements. One example of these improvements include semi or un-planned deployment cells that facilitate cellular access at user-designated sites. These cells are provided by small, low power base stations that may be installed by a user at a home or office site, for instance. Furthermore, these base stations provide enhanced wireless coverage within a relatively small area (e.g., as compared with a macro cell) by connecting to mobile devices and routing device traffic to a wireless network provider over IP or broadband network links. Additionally, these base stations can facilitate reduced mobile power consumption due to inherent proximity of the relatively small coverage area. There are various sizes of small non-macro base stations, and a corresponding variety of terms, including access point base stations, home node B (HNB) or femto cells. Providers see user-connectable non-macro cells as a way to fill gaps in macro-cellular networks at low cost, and typically seek to incentivize users to acquire such cells by modifying how they account cell owners' network usage.

User-deployed cells raise a number of issues, including how devices find a non-macro cell when operating on a macro-cellular network and how mobile providers and cell owners control access to the cells. Though many cell search and acquisition schemes are possible, carriers and device manufacturers seek to provide search and acquisition schemes that are robust, that minimize search and acquisition times, that have minimal impact on device power consumption, and which do not meaningfully affect device performance with existing macro-cellular networks. There is, therefore, a need in the art for non-macro cell search and acquisition procedures that don't meaningfully increase power consumption and thus provide idle state run time consistent with devices that operate solely on the macro-cellular network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the subject disclosure provide search and acquisition for macro and non-macro base stations in a wireless communication environment. In some aspects, a wireless access terminal (AT) can employ disclosed search and acquisition techniques to mitigate power consumption, extending battery life of the AT. As one example, the techniques can enable the AT to reduce operating time for a receive chain in slotted paging mode when the AT is monitoring both macro and non-macro carriers. According to particular aspects, the reduced operating time can be accomplished by performing non-macro cell searching and macro paging analysis on a common receiver. In at least one aspect, the non-macro cell searching can be implemented when the common receiver activates to conduct the macro paging, or implemented as specified by a time-based function of the macro paging activation.

Some aspects of the subject disclosure relate to mobile devices (also known as ATs, user equipment [UE], a mobile wireless communication apparatus, and so forth). In one example, a mobile wireless communication apparatus can comprise a receive chain, a signal processor, and a controller. Preferably the receive chain is configured to produce an output signal from a signal source in a wireless spectrum portion when activated. Preferably the signal processor is coupled to the receive chain to receive the output signal and to produce a processed signal set. Preferably the controller is coupled to the receive chain and the signal processor and configured to sample a wireless spectrum portion comprising a macro paging carrier and a non-macro carrier by activating the receive chain and using the signal processor to produce a processed signal set from the wireless spectrum portion. Preferably the controller is also configured to search the processed signal set for a target non-macro cell pilot.

Another aspect of the subject disclosure provides for a wireless communication apparatus. For example, the wireless communication apparatus can comprise means for employing an antenna to convert a portion of a wireless signal to an electric signal. Additionally, the wireless communication apparatus can comprise means for employing a signal processor to transform the electric signal into a processed symbol set. According to at least one aspect, the apparatus can comprise means for employing a data processor to analyze the processed symbol set and extract macro cell paging information pertinent to the apparatus from one carrier of the wireless signal and to extract information indicating presence of a target non-macro cell from another carrier of the wireless signal.

In still another aspect, some embodiments relate to a computer program product comprising a computer readable medium. An exemplary computer readable medium comprises a first set of codes for causing a computer to sample a wireless spectrum portion comprising a macro carrier and a carrier occupied by a non-macro cell. Additionally, the computer-readable medium comprises a second set of codes for causing the computer to process the sampled portion to produce a processed signal set from the wireless spectrum portion, and a third set of codes for causing the computer to search a portion of the processed signal set that corresponds to the carrier occupied by the non-macro cell for a target non-macro cell pilot. Further to the above, the computer-readable medium comprises a fourth set of codes for causing the computer to employ a portion of the processed signal set that corresponds to the macro carrier for paging channel monitoring.

According to other aspects, the subject disclosure provides a method of integrating non-macro cell search with macro cellular paging monitoring. The method can comprise employing a wireless receiver to produce a processed signal set from a signal comprising a macro cell carrier and at least one carrier where non-macro cells are deployed. Additionally, the method can comprise employing a data processor to execute the following instructions: searching a portion of the processed signal set that corresponds to the non-macro carrier for a target non-macro cell pilot, and evaluating a portion of the processed signal set that corresponds to the macro cell carrier for a paging monitoring operation.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
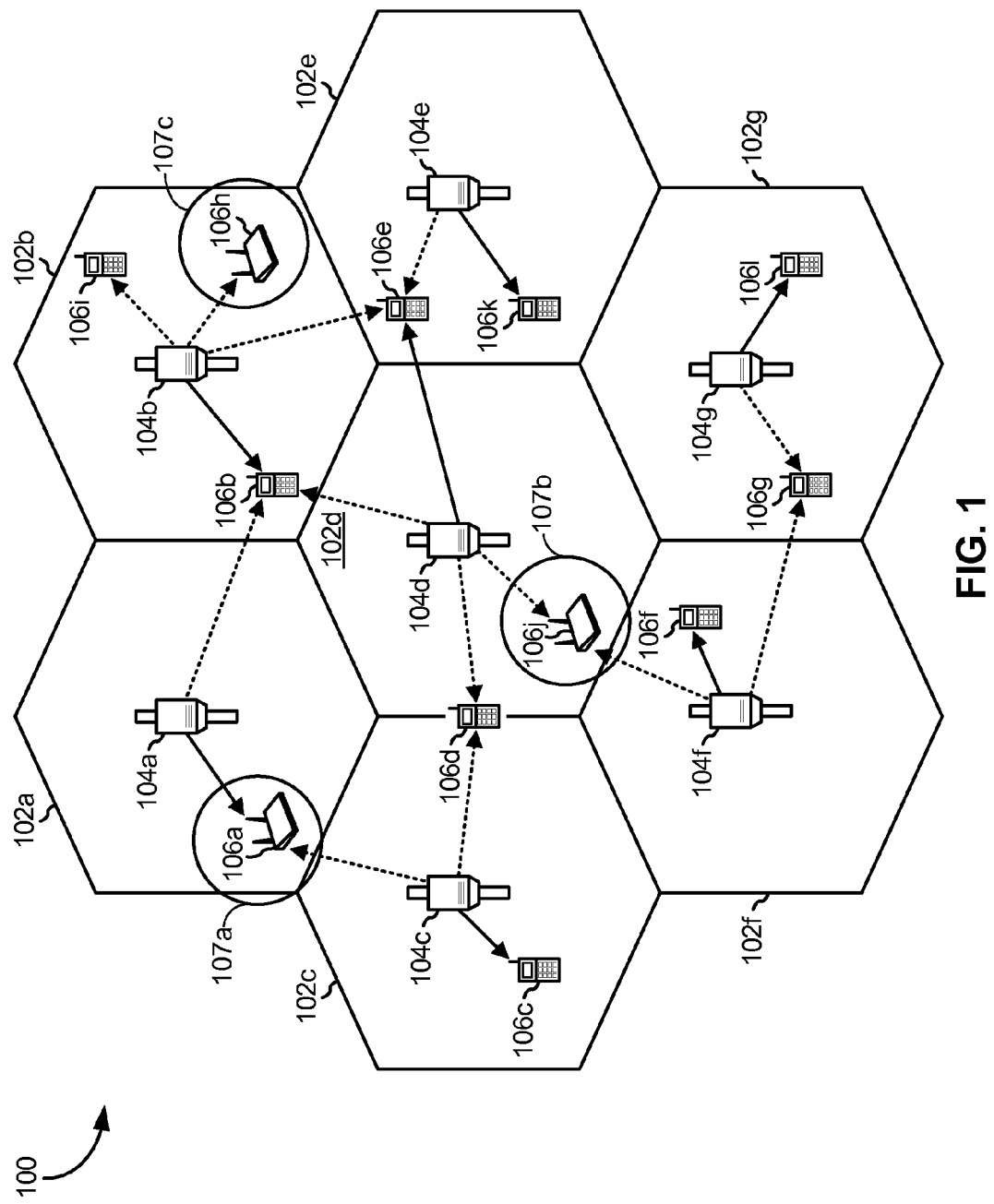
FIG. 1 illustrates an exemplary wireless communication system consistent with some embodiments.

The word "exemplary" is used herein to mean "serving as an example, instance, or illustration." Any embodiment described herein as "exemplary" is not necessarily to be construed as preferred or advantageous over other embodiments.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

The subject disclosure can be applied to any one or combinations of suitable wireless technologies that use paging, including code division multiple access (CDMA), multiple-carrier CDMA (MC-CDMA), wideband CDMA (WCDMA), high-speed packet access (HSPA, HSPA+), time division multiple access (TDMA), frequency division multiple access (FDMA), orthogonal frequency division multiple access (OFDMA) or other multiple access techniques. A wireless communication can be designed to implement one or more standards, such as IS-95, CDMA2000, IS-856, WCDMA, TD-SCDMA, and other standards. An AT can be any suitable data device that communicates through a wireless channel. An AT can further be any of a number of suitable types of devices including but not limited to PC card, compact flash, external or internal modem, or wireless or wireline phone. Disclosed aspects relate to macro cellular networks and to non-macro cells operating within or in proximity to macro cellular networks. Non-macro cells refer to wireless cells smaller than macro cells, operating at lower power than macro cells, operated by equipment under control of parties other than network operators, or the like. Non-macro cells include cells referred to by a corresponding variety of terms, including pico cells, access point base stations, home node B (HNB) or femto cells.

The subject disclosure provides for wireless network acquisition in a multi-carrier wireless environment. Network acquisition can include monitoring different downlink wireless carriers, and processing and decoding symbols conveyed via the different downlink carriers. Analysis of the decoded symbols can be matched to pilot transmissions of known wireless access points deployed on respective carriers. Upon identifying a pilot signal, a mobile device can attempt to establish a link with an access point transmitting the pilot.

As a particular example, consider a wireless network system that deploys one type of access point over a first set of wireless carriers, and another type of access point over a second set of wireless carriers. Based on this type of system, a mobile terminal that can monitor the multiple sets of carriers can decode signals transmitted by the different access points. Thus, the mobile terminal receives transmitted signals over the respective sets of carriers and decodes the received signals. Information for the first type of access point is extracted from data corresponding with the first set of carriers, and information for the second type of access point is extracted from data corresponding with the second set of carriers. Such a network can serve as a platform to provide macro coverage and non-macro coverage within or near a common area.

Some mobile devices have the ability to decode multiple carriers at once. For instance, where a mobile device includes multiple antennas, different frequency carriers can be monitored and decoded concurrently. Alternately, or in addition, where a single antenna can be utilized to obtain a range of frequencies concurrently, respective carriers within the range of decoded frequencies can be processed independently. Where the device is incapable of decoding a particular set of carriers concurrently, however, the mobile device might need to tune away from one carrier to tune into a different carrier.

For instance, when operating within a macro cellular network, such a mobile might tune away from a macro-cellular carrier frequency to tune to and decode a carrier deployed for non-macro access points. In this case, the mobile device should be configured so as not to miss important data transmitted by the macro cellular network, such as paging signals.

Wireless communication systems use slotted paging mode operation, transmitting paging signals to sets of mobile devices during particular time slots. During other time slots, no paging signals are transmitted for a set of devices. This mechanism allows a mobile device in idle state to ignore transmitted signals, and thus conserve power, except for brief periods of time called wake cycle times. To accommodate non-macro cell searching, the mobile device might turn its receiver on at times that are different from the normal wake cycle during idle procedures. This would tend to increase mobile device power consumption in idle state, however.

Referring now the Figures, FIG. 1 illustrates an exemplary wireless communication system 100 configured to support a number of users in which various disclosed embodiments and aspects may be implemented. As shown in FIG. 1, system 100 provides communication for multiple macro cells 102, e.g. cells 102a through 102g, with each cell being serviced by a corresponding access point (AP) 104, e.g. APs 104a through 104g. Each cell may be further divided into one or more sectors (not shown). Various access terminals (AT) 106, e.g. ATs 106a through 106k, are dispersed throughout the system. ATs are interchangeably known as user equipment (UE). Each access terminal (AT) 106 may communicate with one or more APs 104 on a forward link (FL) or a reverse link (RL) at a given moment, depending, for example on whether the AT is active and whether the AT is in soft handoff mode. The wireless communication system 100 may provide service over a large geographic region. For example, macro cells 102a through 102g might cover a few blocks in a city neighborhood. Similarly a femto cell coverage area 107a through 107c might each only cover a much smaller area.

Figure 2A:
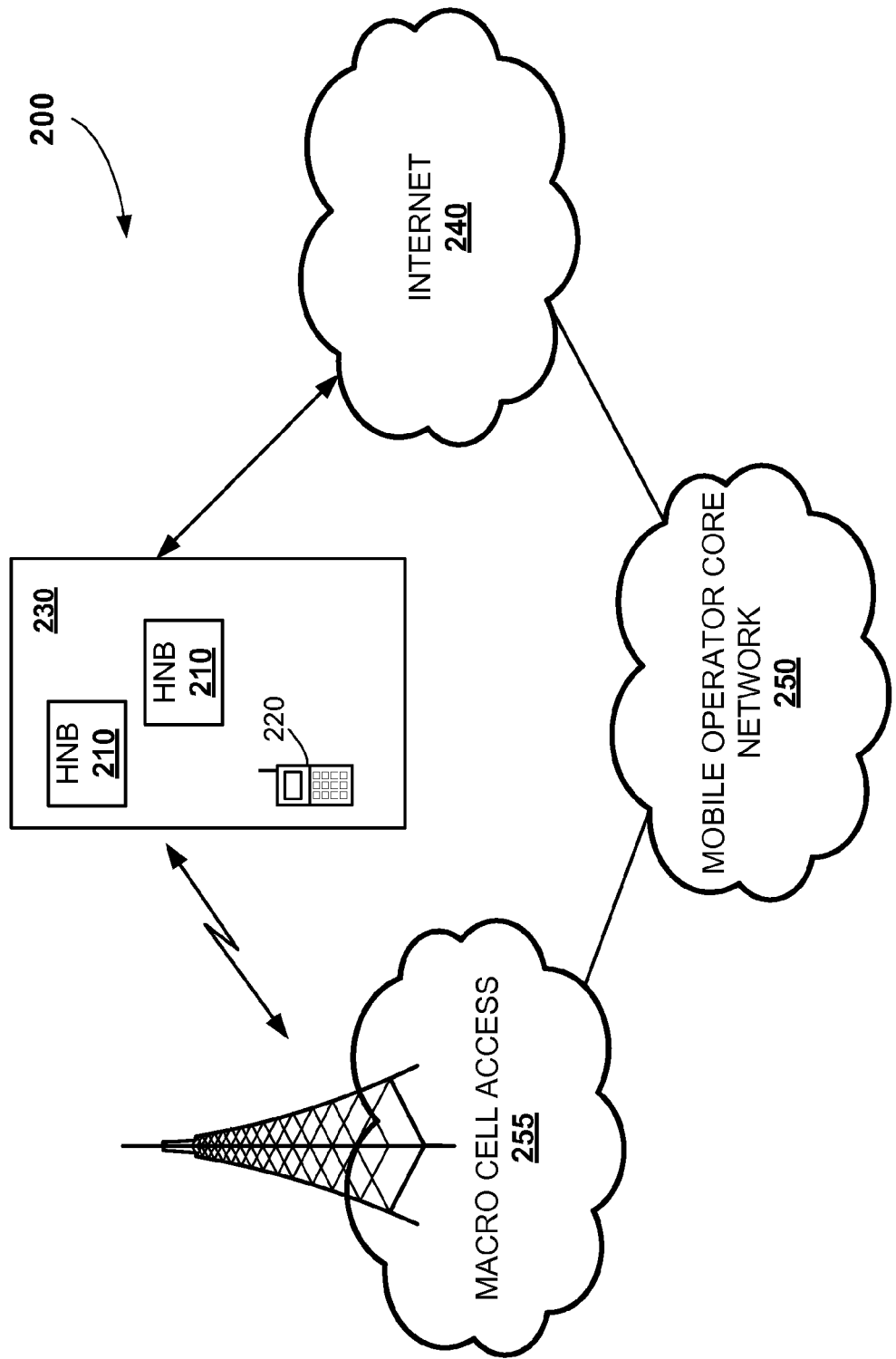
FIG. 2A illustrates an exemplary communication system enabling deployment of access point base stations within a network environment consistent with some aspects.

FIG. 2A illustrates an exemplary communication system 200 enabling deployment of access points (base stations) within a network environment. As shown in FIG. 2A, the system 200 includes multiple access point base stations or home node B (HNB) units. HNBs 210 are each installed in a corresponding small area network environment 230, e.g. a user residence or other user-controlled environment such as a small or home office. Further HNBs 210 are configured to serve associated UE 220. In some embodiments HNBs are further configured to serve alien UE. Each HNB 210 is coupled to a public network 240 and a mobile operator core network 250 via a network link (not shown). Preferably the public network 240 is the Internet. Exemplary network links include cable modems or DSL routers.

Although embodiments described herein use third generation partnership project (3GPP) terminology, one skilled in the art should understand that the embodiments may be applied to 3GPP2 technology (1xRTT, 1xEVDO R10, RevA, RevB) as well as 3GPP technology (Rel99, Rel5, Rel6, Rel7) and other related technologies. In embodiments described herein, preferably the owner of the HNB 210 subscribes to mobile service, e.g. 3G mobile service, offered through the mobile operator core network 250 and the UE 220 is capable of operating both in a macro cellular environment and in residential small area network environment of which HNB 210 is part. Thus the network environment of which HNB 210 is part is backward compatible with existing UE 220.

One issue raised by HNB or femto cell networks is how UE 220 finds HNB 210 when operating using the macro cell 255 to core network 250. For instance, UE 220 may be tuned to a frequency different than the one used by HNB 210 for communication with macro cell 255. In the course of standard idle procedures UE 220 evaluates the neighbor cells of its current macro cell, e.g. cell 255, by searching a set of neighbor cells indicated by its current macro cell. In general, femto cells preferably reuse one of several possible carrier frequencies employed by the macro cellular network 250. However, because HNB 210 may be deployed or re-deployed by an end user (e.g., the end user could initially set up HNB 210 in a residential facility, and later move it to an office facility) independent of a network operator, macro network 250 may be have insufficient or inaccurate data on the position of HNB 210 relative macro cell 255. In some circumstances, macro network 250 may be wholly unaware of HNB 210 (e.g., when HNB 210 is first deployed) or an identifier employed by HNB 210 for pilot transmissions. In these or similar circumstances, HNB 210 would not appear in a neighbor cell list provided by macro cell 255.

If the set of neighbor cells to be searched does not include HNB210 on the frequency assigned for femto cells, UE 220 will not find HNB 210 and will continue to operate on the macro cellular network even when in range of HNB 210. Further even if UE 220 finds HNB 210, UE 220 may not have authorized access. These problems are further complicated due to the nature of femto cellular networks, where new femto cells are put into operation constantly, making it impractical to list them in the macro cell 255 neighbor list.

Figure 2B:
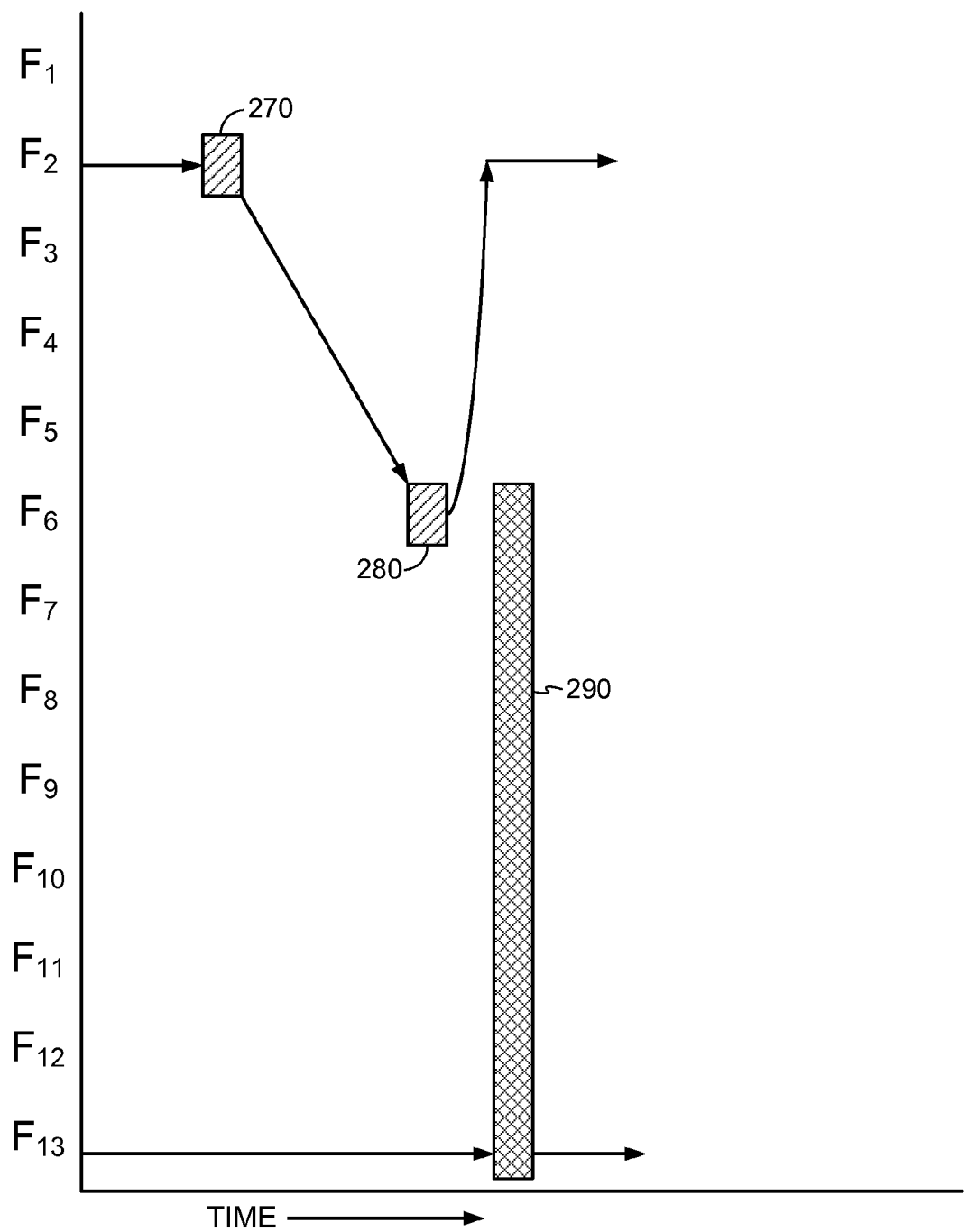
FIG. 2B illustrates sample techniques for paging channel monitoring consistent with some aspects.

Ordinarily, an AT operating on both macro and non-macro networks needs to turn it's receive chain on for two separate purposes: paging channel monitoring and non-macro cell searching. FIG. 2B depicts two techniques for paging channel monitoring and non-macro cell searching: The time multiplexed technique used in traditional designs, and multi-carrier sampling technique that is the subject of this invention. FIG. 2B assumes that femto cells are deployed on carrier frequency F6. In a time multiplexed technique, an AT is monitoring paging channel on F2, and searches frequencies F2 (for paging channel monitoring) and F6 (for non-macro-cell searching) in succession. That is, a terminal might tune to and monitor frequency F2 in time slot 270, followed by monitoring of frequency F6 in time slot 280. As depicted, the terminal might then re-tune to frequency F2 after time slot 280 and monitor the paging channel F2 for subsequent paging signals. This tuning and re-tuning can be accomplished periodically (or, e.g., based on a suitable a-periodic function) to monitor macro network paging channels and search for non-macro cells at common or different intervals. One drawback to this technique, however, is the additional power consumption associated with successively activating the receive chain in different time slots.

Using a multi-carrier sampling technique shown at the bottom of FIG. 2B, an AT can reduce the power consumption involved in receiving different channels in succession. According to the multi-carrier sampling technique, an AT samples a broad range of frequencies in a particular time slot, 290, encompassing several frequency carriers. This enables the AT to monitor a macro paging channel on frequency F13, for instance, in parallel with sampling frequency F6 for the purpose of non-macro cell search. Frequencies F6, F7, F8, F9, F10, F11, F12, and F13 are all encompassed in an example broadband sampling operation depicted by FIG. 2B.

Broadband sampling can mitigate power consumption associated with time multiplexed sampling, but does have some practical drawbacks. For instance, a range of frequencies that can be sampled by an AT is not unlimited. Typically, sampling range is limited by receiver hardware, including an analog to digital (A/D) conversion rate and over-sampling rate. More specifically, the A/D rate multiplied by the oversampling rate must be at least greater than the magnitude of the difference of the macro and non-macro carrier frequencies (written mathematically as $|F_M-F_F|$ e.g. see FIGS. 4-5, infra). Where a non-macro carrier and macro paging carrier are separated by too great of a range of frequencies, the AT may have to revert to the time multiplex sampling technique.

In further detail of the time multiplexed technique, during paging channel monitoring, the AT tunes to the macro carrier on which it monitors the paging channel, and samples that signal to perform idle state operations. In non-macro cell searching, the AT tunes to the carrier where target non-macro cells are located to determine whether it is within coverage of a non-macro cell. To ensure low probability of missing a page, page channel monitoring must occur in every wake cycle during slotted mode paging. For example, typical page channel cycle is 2.5 or 5 seconds, which means that the AT must turn its receive chain on and monitor its assigned paging slot once in each of these cycles. An AT must stay on for a period of time sufficient to detect whether it is being paged. The time the AT is turned on is called wake cycle. Non-macro cell searching needn't occur at a precise time within a wake cycle and can occur less frequently than page channel monitoring. However, preferably, non-macro cell discovery delay should be no more than a few seconds and ideally not exceeding the page cycle period. In one example design, the AT receiver remains on after each page channel monitoring operation, immediately thereafter tunes to the frequency where non-macro cells are deployed, samples that carrier, and conducts non-macro cell pilot searching on the sample. Depending on the desired tradeoff between standby time and non-macro cell discovery delay, this extended receiver on time need not occur on every page cycle. However, in every case, this extended receiver on time causes increased power consumption in idle state as compared to page channel monitoring alone.

To summarize, in some embodiments of the present invention, the AT uses the time that it normally turns on for paging channel monitoring on the macro cell for non-macro cell searching. This is illustrated at 290 in FIG. 2B. For example, in slotted mode operation, in the assigned slot of the AT within the slotted mode cycle, the AT turns its receive chain on for both paging channel monitoring on frequency F13 and non-macro cell searching on frequency F6. This concurrent monitoring/searching can be accomplished by a broadband sampling technique that converts a range of wireless signal frequencies, including at least frequency F6 and F13, into electric signals at a receiver. The receiver can then demodulate the electric signals into a set of decoded symbols, where a subset of the decoded symbols corresponds with frequency F6 and another subset corresponds with frequency F13. Analysis of these subsets of symbols can be performed to extract information from the respective frequencies, including paging signals on the macro frequency F13 and pilot signal transmissions on the non-macro frequency F6.

Figure 3:
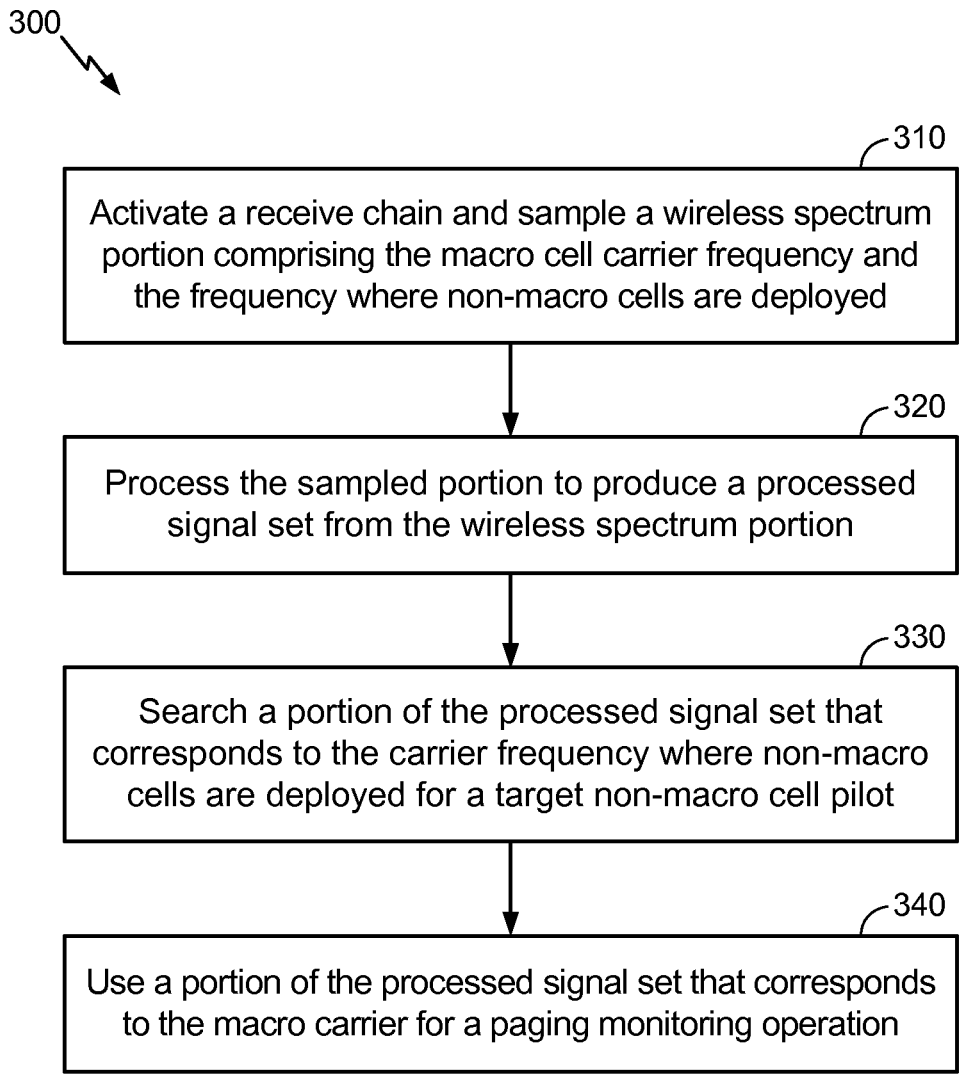
FIG. 3 illustrates an example method of using non-macro cells within a macro-cellular network consistent with further aspects.

FIG. 3 illustrates an example method 300 of using non-macro cells within a macro-cellular network consistent with some disclosed aspects. At 310, the method includes activating a receive chain and using the receive chain to sample a wireless spectrum portion comprising a macro paging carrier and the carrier frequency in which non-macro cells are deployed. According to some aspects, the sampling of the wireless spectrum portion further comprises broadband sampling. In at least one aspect, employing the broadband sampling can be conditioned on a bandwidth of frequencies encompassing the paging carrier and non-macro carrier, relative a sampling rate of the receive chain. According to at least one other aspect, activating the receive chain to sample the wireless spectrum portion comprising the macro paging carrier and the non-macro carrier frequency is conducted periodically. In some instances, the activation period can be the same as a wake cycle associated with the macro paging carrier. In other instances, the activation period can be a subset of the wake cycles. In at least one instance, the activation period can be based on a minimum acquisition delay period for acquiring a target non-macro cell.

At 320, the method further includes processing the sampled portion to produce a processed signal set from the wireless spectrum portion. Processing the sampled portion can further include demodulating a signal output by the receive chain in response to receiving the wireless spectrum portion. The demodulated signal can then be decoded, resulting in a set of processed symbols that form the processed signal set. A subset of the processed signal set corresponds at least to the macro paging carrier frequency, and another subset of the processed signal set corresponds at lest to the non-macro carrier frequency.

At 330, the method further includes searching for a target non-macro cell pilot within a subset of the processed signal set that corresponds to the carrier frequency where non-macro cells are deployed. As an example, method 300 can search a suitable subset of the processed signal set for an identifier associated with the non-macro cell pilot. If the identifier is found within the subset of processed signals, method 300 can infer that the target non-macro cell is nearby. Otherwise, method 300 can infer that the target non-macro cell is not within communication range.

At 340, the method further includes using a portion of the processed signal set that corresponds to the macro carrier for paging monitoring operation. Steps 310 through 340 can be rearranged as may be convenient for implementation of any of various embodiments. In one aspect, activating the receive chain occurs during a wake cycle paging slot. Preferably, processing begins with an analog/digital conversion of the wireless spectrum portion.

Consistent with some aspects, an AT receiver samples a broader frequency band (relative to paging channel monitoring alone) of the down-converted RF signal. This multicarrier sampling approach permits sampling of multiple carriers simultaneously and preferably employs an analog/digital converter sufficient to convert the broader frequency band.

Figure 4:
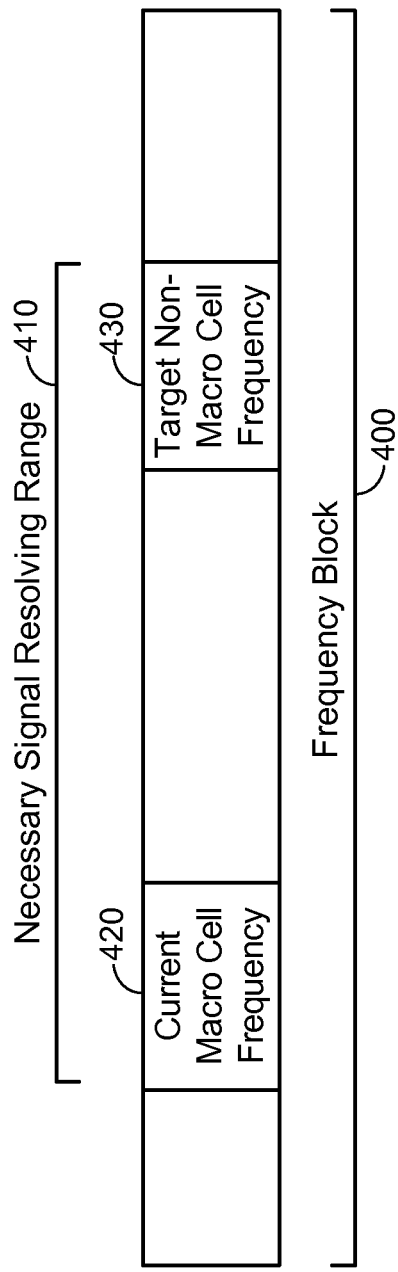
FIG. 4 illustrates an example wireless spectrum block configuration and receiver equipment configuration for using non-macro cells within a macro-cellular network consistent with other aspects.

FIG. 4 illustrates a sample frequency block 400 with a current macro cell frequency 420 and another frequency 430, where the target non-macro cell is deployed. The bandwidth 410 shows the signal processor resolution necessary to employ broadband sampling techniques to resolve both macro cell frequency 420 and non-macro cell frequency of deployment 430 concurrently. Processor resolution is typically based on a receiver over-sampling rate compared with the full frequency bandwidth 410 to be resolved, among other things (e.g. see FIG. 2B, supra).

Consistent with some aspects of the subject disclosure, an example wireless communication system according to aspects of the subject disclosure comprises a set of access terminals, a set of access points that form a network of macro cells, and a set of non-macro cells (e.g., see FIG. 1, supra). Preferably, each AT comprises a signal processor capable of resolving carrier signals separated by a first bandwidth. Each macro cell operates on at least one carrier frequency. Each non-macro cell is comprised of a small or low power access point (e.g., approximately 0.5 to 2 watts), and the non-macro cells operate at a carrier frequency that may be the same or different as one of the macro carrier frequencies. Preferably, the non-macro cell frequency of deployment is such that any of the macro cellular frequencies are separated in frequency from the non-macro cell frequency by no more than the first bandwidth. Said differently, the magnitude of the difference in macro and non-macro frequencies is preferably less than the first bandwidth.

Figure 5:
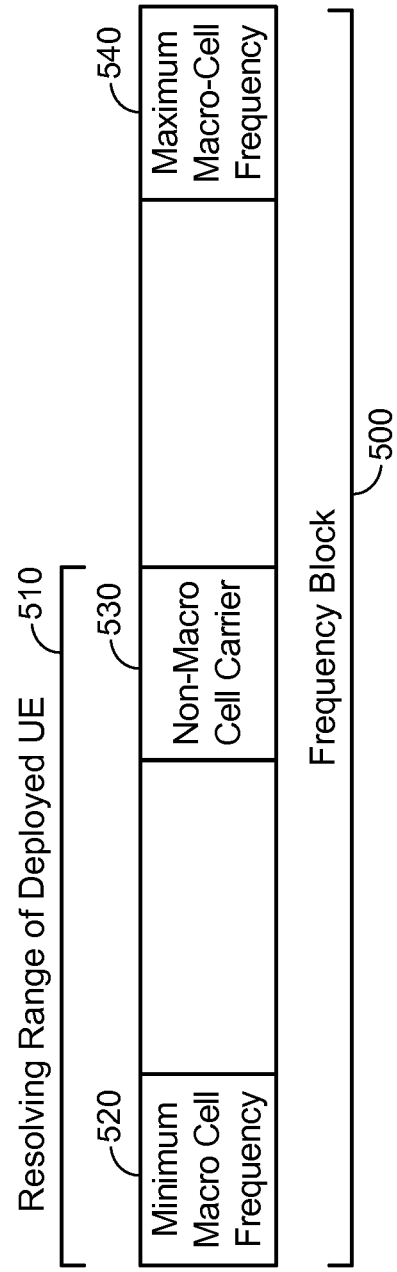
FIG. 5 illustrates a sample wireless spectrum block and macro-cellular carrier configuration for using non-macro cells within a macro-cellular network consistent with further aspects.

FIG. 5 illustrates an example frequency block 500 arranged for a wireless network consistent with other disclosed aspects. As shown, a non-macro cell carrier frequency of deployment 530 is disposed near the middle of the block 500. Minimum macro cell frequency 520 and maximum macro cell frequency 540 are disposed within resolving range 510 of signal processors of user equipment, measured from the non-macro cell carrier frequency 530.

For example, in using an analog to digital convertor, during A/D conversion, if the macro cell frequency monitored by this mobile is at frequency FM, and the non-macro cell frequency of deployment is FF, then A/D rate must be such that the absolute value of the frequency difference |FM−FF| does not exceed the A/D convertor ability to extract the desired signals. Furthering this example, if a design requires four (4) times oversampling, and A/D speed is 80 MHz, then |FM−FF|+BW (where BW is the carrier frequency bandwidth) must not exceed 20 MHz. Preferably deployment of non-macro cells maximizes the possibility of the multi-carrier capture with the placement of non-macro cells on the carrier frequency 530 as illustrated in FIG. 5. In a further example, assume a wireless operator who has a 35 MHz block (500) in each forward link and reverse link, and carrier frequency bandwidth is 5 MHz (520, 530, 540). The operator can place non-macro frequency FF (530) in the middle of that block (500), i.e. as the fourth carrier, counting from either end of the 7-carrier (35 MHz) deployment. With such an arrangement of carriers, a mobile monitoring a macro carrier (520, 540) at either end of the frequency block, and having 20 MHz signal resolving power of the above example can also monitor the non-macro carrier (530). In a manner as described, an AT may employ the above methodology (300) to capture the non-macro frequency (530) while monitoring the paging channel (520, 540) at FM at the end of the block.

Figure 6:
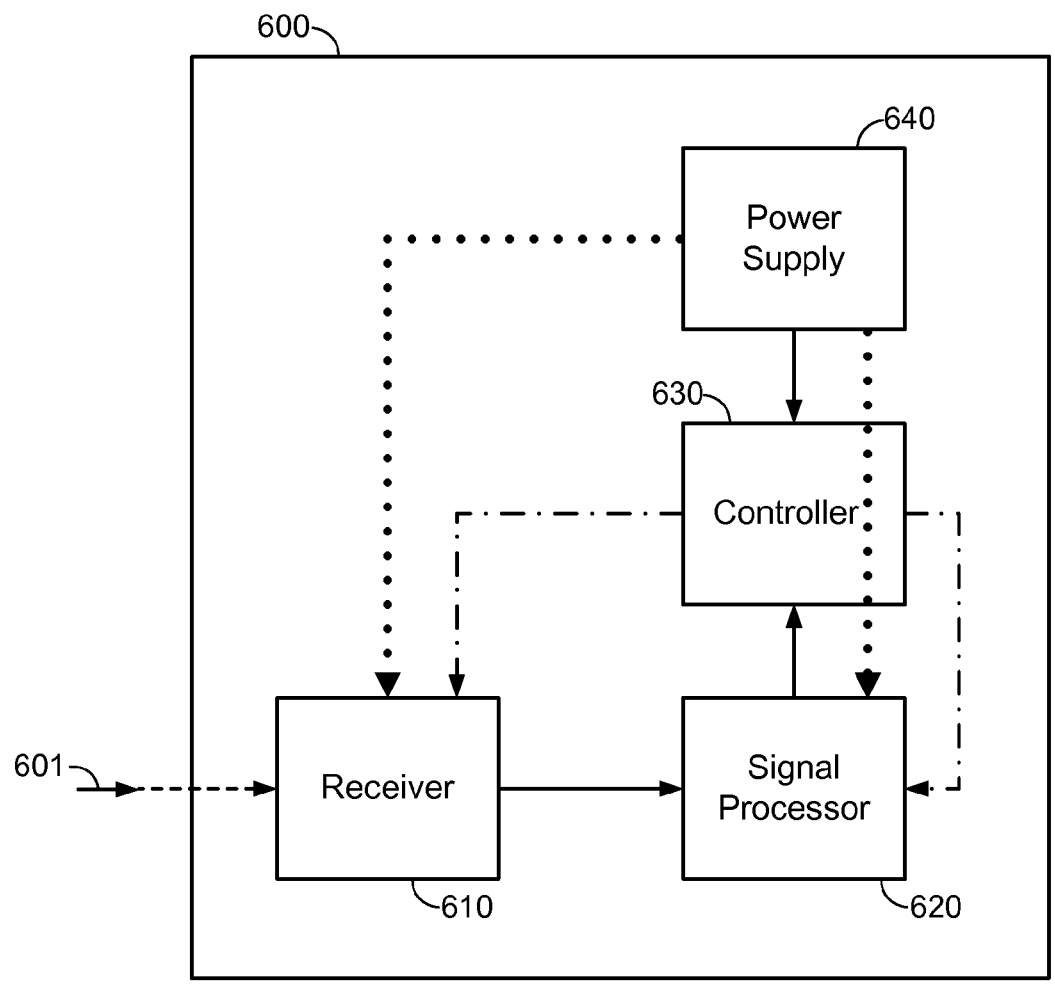
FIG. 6 is a block diagram of an example receiver portion of a mobile station configured to use non-macro cells within a macro-cellular network consistent with some aspects.

FIG. 6 illustrates an AT 600 comprising a receive chain 610, a signal processor 620, a controller 630 and power supply 640. Preferably the receive chain 610 comprises a signal source (not shown) and is configured to produce an output signal from a wireless spectrum portion 601 when activated. During activation, receive chain 610 consumes power from power supply 640. Preferably the signal processor 620 is coupled to the receive chain 610 to receive the output signal and to produce a processed signal set. Preferably the controller 630 is coupled to the receive chain 610 and the signal processor 620 and configured to sample a wireless spectrum portion 601 comprising a macro cell carrier frequency and the carrier frequency where non-macro cells are deployed by activating the receive chain 610 and using the signal processor 620 to produce a processed signal set from the wireless spectrum portion 601. Preferably the controller 630 is also configured to search the processed signal set for a target non-macro cell pilot.

Figure 7:
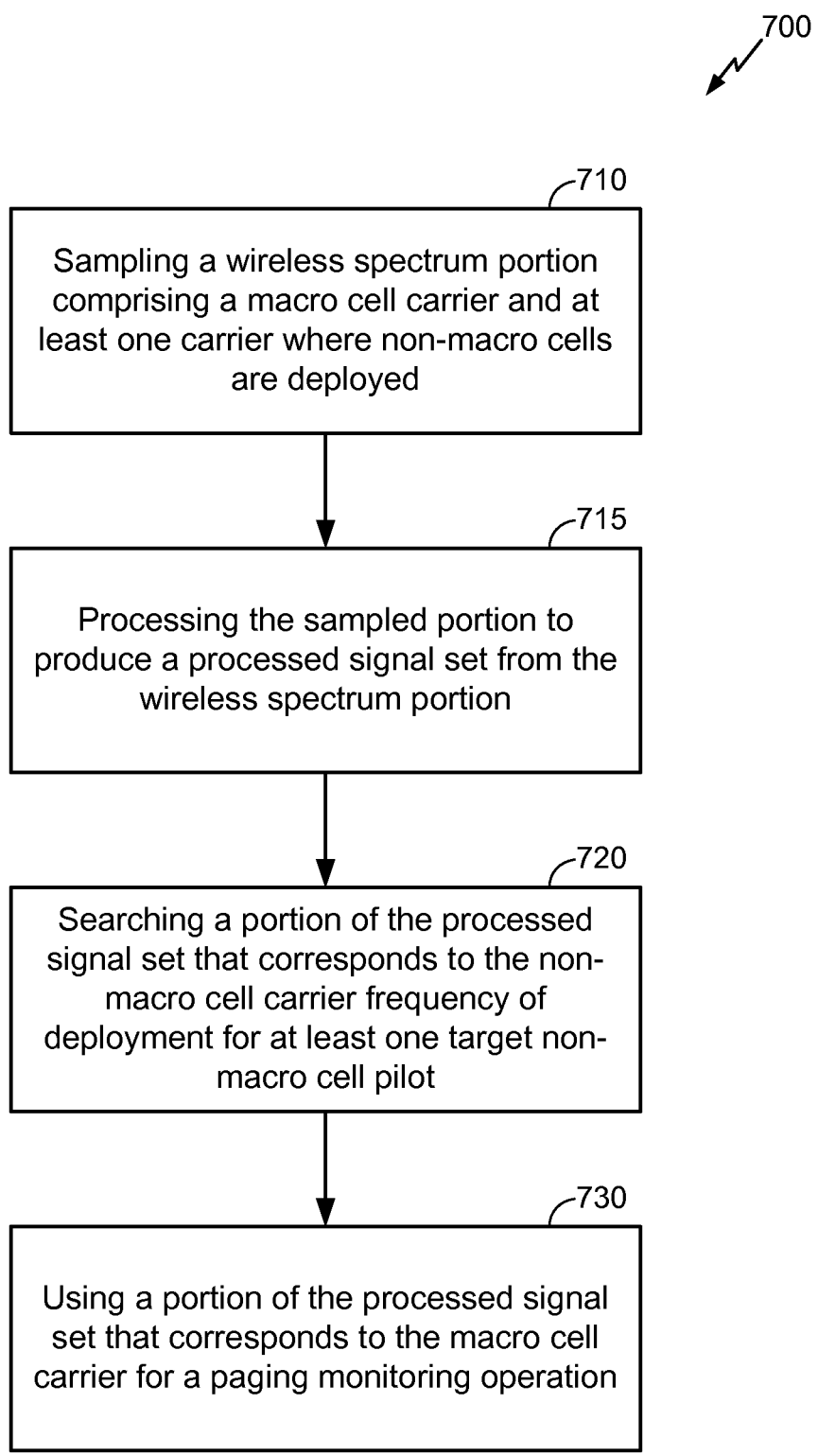
FIG. 7 is a flow diagram of a method consistent with additional aspects.

As shown in FIG. 7, and in somewhat more formal terms, a method 700 of integrating non-macro cell search with macro cellular paging monitoring might include the steps of:
   sampling a wireless spectrum portion comprising a macro cell carrier and at least one carrier where non-macro cells are deployed (see operation 710);
   processing the sampled portion to produce a processed signal set from the wireless spectrum portion (see operation 715);
   searching a portion of the processed signal set that corresponds to the non-macro carrier for a target non-macro cell pilot (see operation 720); and
   using a portion of the processed signal set that corresponds to the macro cell carrier for a paging monitoring operation (see operation 730).

Figure 8:
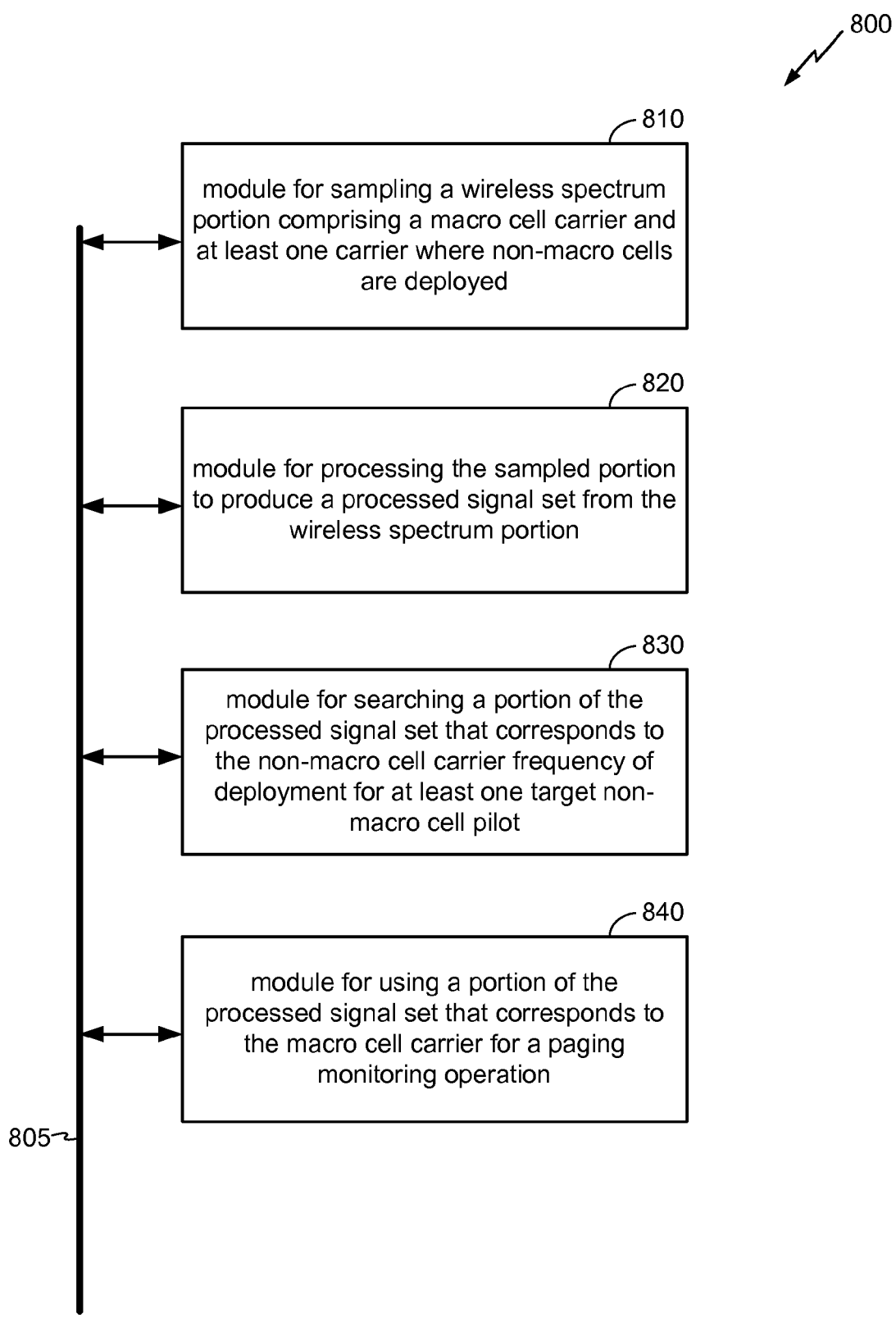
FIG. 8 illustrates a block diagram of an example access terminal configured for multi-carrier wireless communications according to one or more aspects.

Of course, the method 700 might be implemented as shown in FIG. 8 in the embodiment of a system that includes multiple modules communicating over a shared bus 805, including any of the following:
   a sampling module 810 for sampling a wireless spectrum portion comprising a macro cell carrier and at least one carrier where non-macro cells are deployed;
   a processing module 820 for processing the sampled portion to produce a processed signal set from the wireless spectrum portion;
   a searching module 830 for searching a portion of the processed signal set that corresponds to the non-macro cell carrier frequency of deployment for at least one target non-macro cell pilot; and
   a monitoring module 840 for using a portion of the processed signal set that corresponds to the macro cell carrier for a paging monitoring operation.

One advantage of embodiments is that an AT can take samples at the non-macro cell frequency of deployment during its normal slot on-time. Thus the AT will not increase the access terminal's receiver chain on-time, and will conserve battery power better than in the alternative case described above. The disclosed methodologies are applicable to applications of off-frequency searching other than non-macro cell searching.

Figure 9:
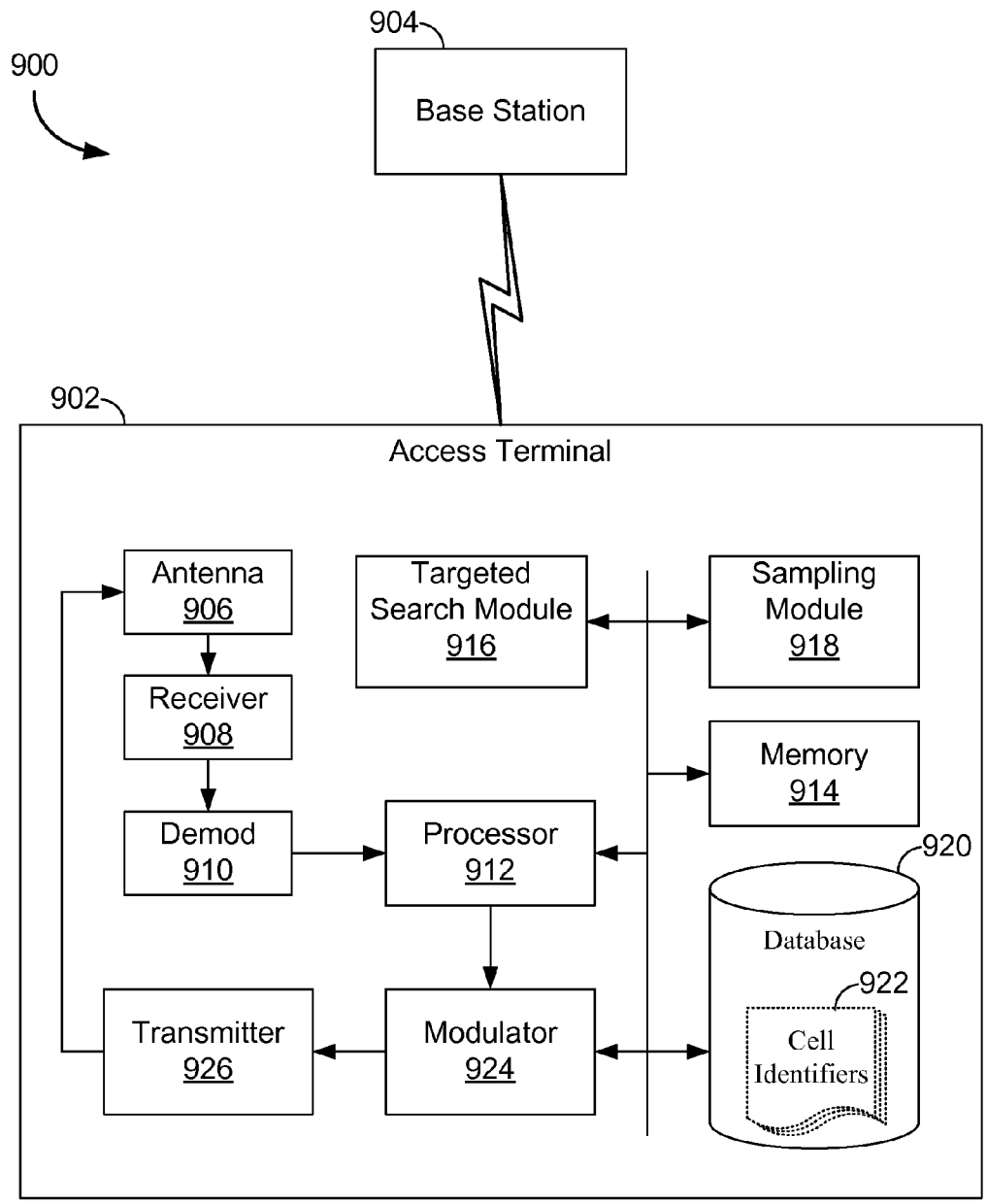
FIG. 9 depicts a flowchart of a sample method for multi-carrier wireless operation at reduced power consumption according to some aspects.

FIG. 9 depicts a block diagram of an example system 900 comprising an AT 902 configured for wireless communication according to aspects of the subject disclosure.

AT 902 can be configured to wirelessly communicate with one or more base stations 904 (e.g. access point) of a wireless network. Based on such configuration, AT 902 can receive wireless signals from a base station (904) on a forward link channel and respond with wireless signals on a reverse link channel. In addition, AT 902 can comprise instructions stored in memory 914 for analyzing received wireless signals, specifically, for monitoring macro and non-macro wireless carriers concurrently, as described herein.

AT 902 includes at least one antenna 906 (e.g. a wireless transmission/reception interface or group of such interfaces comprising an input/output interface) that receives a signal and receiver(s) 908, which perform typical actions (e.g., filters, amplifies, down-converts, etc.) on the received signal. In general, antenna 906 and a transmitter 930 (collectively referred to as a transceiver) can be configured to facilitate wireless data exchange with base station(s) 904. The set of antennas 906 can comprise separate antennas tuned to different frequencies over which macro and non-macro cells are deployed. In other aspects, the set of antennas 906 can comprise one or more antennas tuned to a broad range of frequencies, as described herein. In at least one aspect, the set of antennas 906 can comprise one antenna that receives multi-carrier information via time multiplexing, as described herein.

Antenna 906 and receiver(s) 908 can also be coupled with a demodulator 910 that can demodulate received symbols and provide such signals to a data processor(s) 912 for evaluation. It should be appreciated that data processor(s) 912 can control and/or reference one or more components (906, 908, 910, 914, 916, 918, 920, 922, 924) of AT 902. Further, data processor(s) 912 can execute one or more modules, applications, engines, or the like (916, 918, 920) that comprise information or controls pertinent to executing functions of the AT 902. For instance, such functions can include processing portions of a received wireless spectrum, distinguishing different wireless carriers from the processed portions, identifying macro and non-macro carrier subsets of the processed portions, analyzing a macro carrier subset(s) for important mobility or like activities associated with a macro network, or analyzing non-macro carrier subset(s) for identifying nearby non-macro cells, or the like.

Additionally, memory 914 of AT 902 is operatively coupled to data processor(s) 912. Memory 914 can store data to be transmitted, received, and the like, and instructions suitable to conduct wireless communication with a remote device (904). Specifically, the instructions can be utilized to implement the various functions described above, or elsewhere herein. Further, memory 914 can store the modules, applications, engines, etc. (916, 918, 920) executed by data processor(s) 912, above.

Further to the above, access terminal 902 can comprise a targeted search module 916 for initiating access terminal search functionality for selected non-macro wireless network access points. For instance, targeted search module 916 can access a database 920 comprising stored cell identifiers 922. At least one set of the cell identifiers 922 can include information (e.g., a distinct ID) specifying one or more preferred femto cells associated with the access terminal 902. The information can be compared with a subset of processed symbols that correspond to a non-macro portion of a received wireless spectrum (e.g., a non-macro carrier frequency). If a cell identifier 922 is found within the processed subset of symbols, targeted search module 916 can infer that one of the preferred femto cells is within range of access terminal 902. In some aspects, targeted search module 916 can initiate search for one or more preferred femto cells if a cell identifier 922 for such a cell is transmitted in a neighbor cell report by base station 904, or otherwise associated (e.g., by proximity, or in a cell acquisition list) with base station 904. Further, the targeted search can be implemented within a time period specified by a non-macro cell acquisition latency goal (e.g. a 2.5 second acquisition goal, 5 second acquisition goal, etc.).

In at least one aspect of the subject disclosure, the set of cell identifiers 922 can also include information specifying a position location of one or more of the preferred femto cells. Targeted search module 916 can compare the position information of a preferred femto cell with position location of AT 902 (e.g., determined from a GPS module—not depicted, or transmitted from base station 904). If a preferred femto cell is within a threshold proximity to AT 902, determined from the position location comparison, targeted search for that preferred femto cell can be initiated by targeted search module 916. Otherwise, the targeted search can be cancelled to mitigate power consumption at AT 902. Position location information for preferred femto cells can comprise a GPS location, a wireless network triangulation point, proximity or distance to a nearest macro cell, or the like, or a combination thereof.

According to one or more other aspects, the database 920 can further store a set of permissible non-macro cell pilot identifiers employed by base station 904 or a wireless network coupled with base station 904. A permissible non-macro cell pilot identifier is a distinct identifier for use by femto cells on a non-macro cell carrier frequency. A sampling module 918 can employ the permissible identifiers to determine what femto cells are in wireless range of AT 902. Additionally, by comparing identified femto cells with the list of preferred cell identifiers 922, the search module can activate such femto cells, for search and access by target search module 916, discussed above. Sampling module 918 can activate receiver 908 and processor 912 at relatively infrequent periods (e.g., every 30 to sample a surrounding coverage area for femto cells. Alternatively, or in addition, the sampling module can sample the surrounding area upon entering a new network location area, macro coverage area, or the like, or upon handing off to a new macro cell, receiving a new list of permissible non-macro cell identifiers, and so forth.

Figure 10:
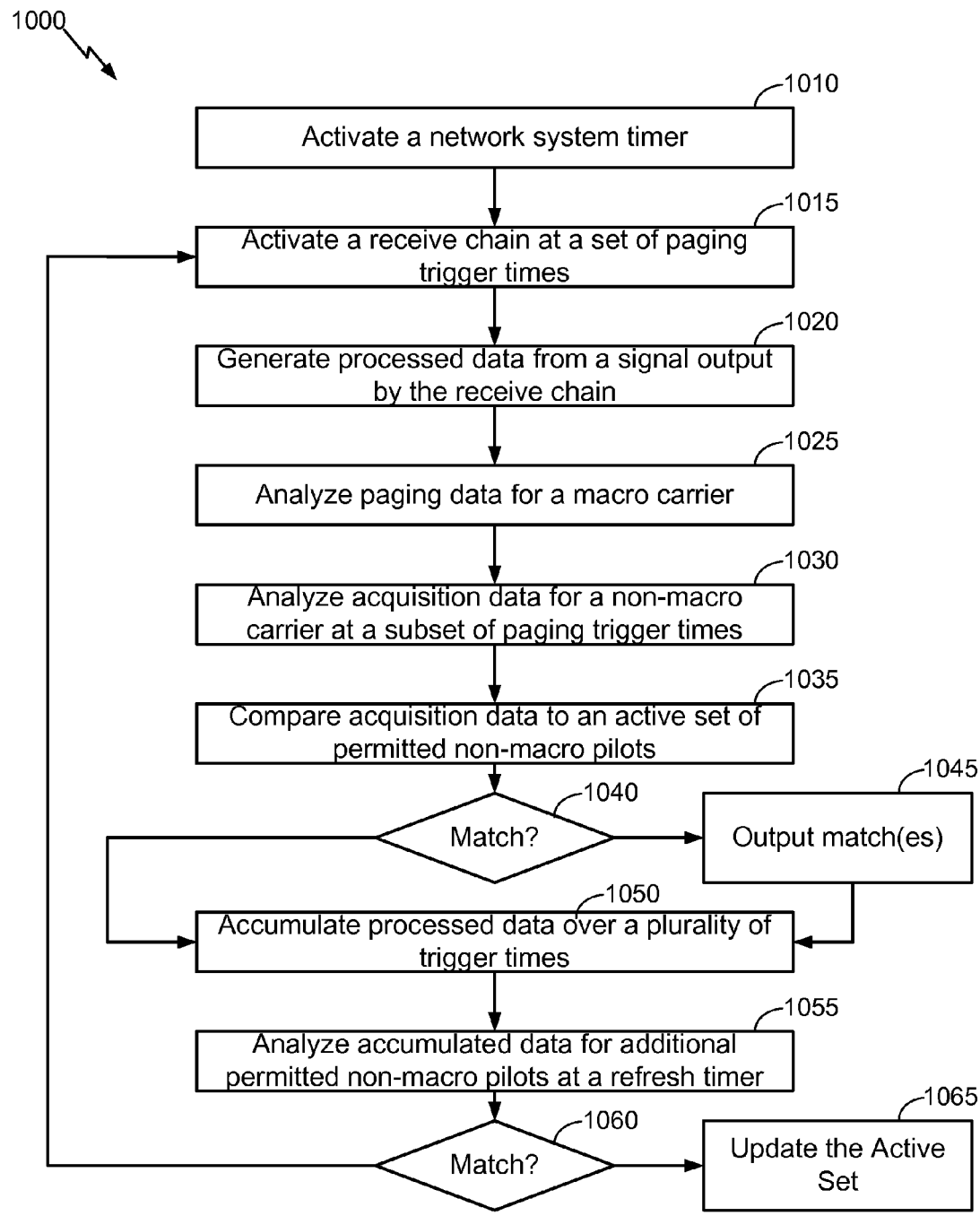
FIG. 10 is a block diagram of a processing block implementation of an example system consistent with some aspects.

FIG. 10 illustrates a flowchart of an example method 1000 according to particular aspects of the subject disclosure. At 1010, method 1000 can activate a network system timer for macro cell paging events. At 1015, method 1000 can activate a receive chain at a set of paging trigger times. The receive chain can be tuned first to a macro carrier frequency, then to a non-macro carrier frequency, successively sampling a portion of a wireless spectrum at the respective frequencies. Alternatively, the receive chain can tune to a range of carrier frequencies encompassing both the macro carrier frequency and the non-macro carrier frequency.

At 1020, method 1000 can generate processed data from a signal output by the receive chain. The processed data includes a subset of data that corresponds with signals transmitted on the macro carrier frequency. Further, the processed data can include another subset of data that corresponds with signals transmitted on the non-macro carrier frequency.

At 1025, method 1000 can analyze paging signals in the subset of processed data that corresponds with signals transmitted on the macro carrier frequency. Moreover, method 1000 can implement a paging monitoring operation, determining whether a device is paged based on identified paging signals. At 1030, method 1000 can analyze non-macro cell pilot acquisition data for the non-macro carrier at a subset of the paging trigger times. At 1035, method 1000 can compare the acquisition data to an active set of permitted non-macro cells. Permitted non-macro cells can comprise a set of pilot signal identifiers for HNBs associated with a particular AT. In at least one aspect of the subject disclosure, a permitted non-macro cell can become activated, and specified in the active set, if an identifier for such non-macro cell is included in a neighbor cell list obtained from the macro carrier frequency. Alternatively, or in addition, the permitted non-macro cell can become activated if proximity to such non-macro cell is within a threshold distance (e.g., as determined from GPS, network triangulation technique, etc.).

At 1040, a determination is made as to whether a permitted non-macro pilot in the active set is identified from the processed subset of data that corresponds with the non-macro carrier frequency. If a match occurs, method 1000 proceeds to 1045, where the match is output to a display module, cell management module, stored in memory, or the like. Otherwise, method 1000 proceeds to 1050 where processed data is accumulated over a plurality of paging trigger times. At 1055, method 1000 can analyze accumulated data for a set of non-macro cell identifiers employed by a macro cell coverage area of a wireless network. The analysis can be conducted upon expiration of a general non-macro search timer. Non-macro cell identifiers that are found can be compared with a list of permitted non-macro cell identifiers. If a match occurs at 1060, method 1000 can proceed to 1065 and update the set of active permitted non-macro cell identifiers. Otherwise, method 1000 can return to reference number 1015.

Figure 11:
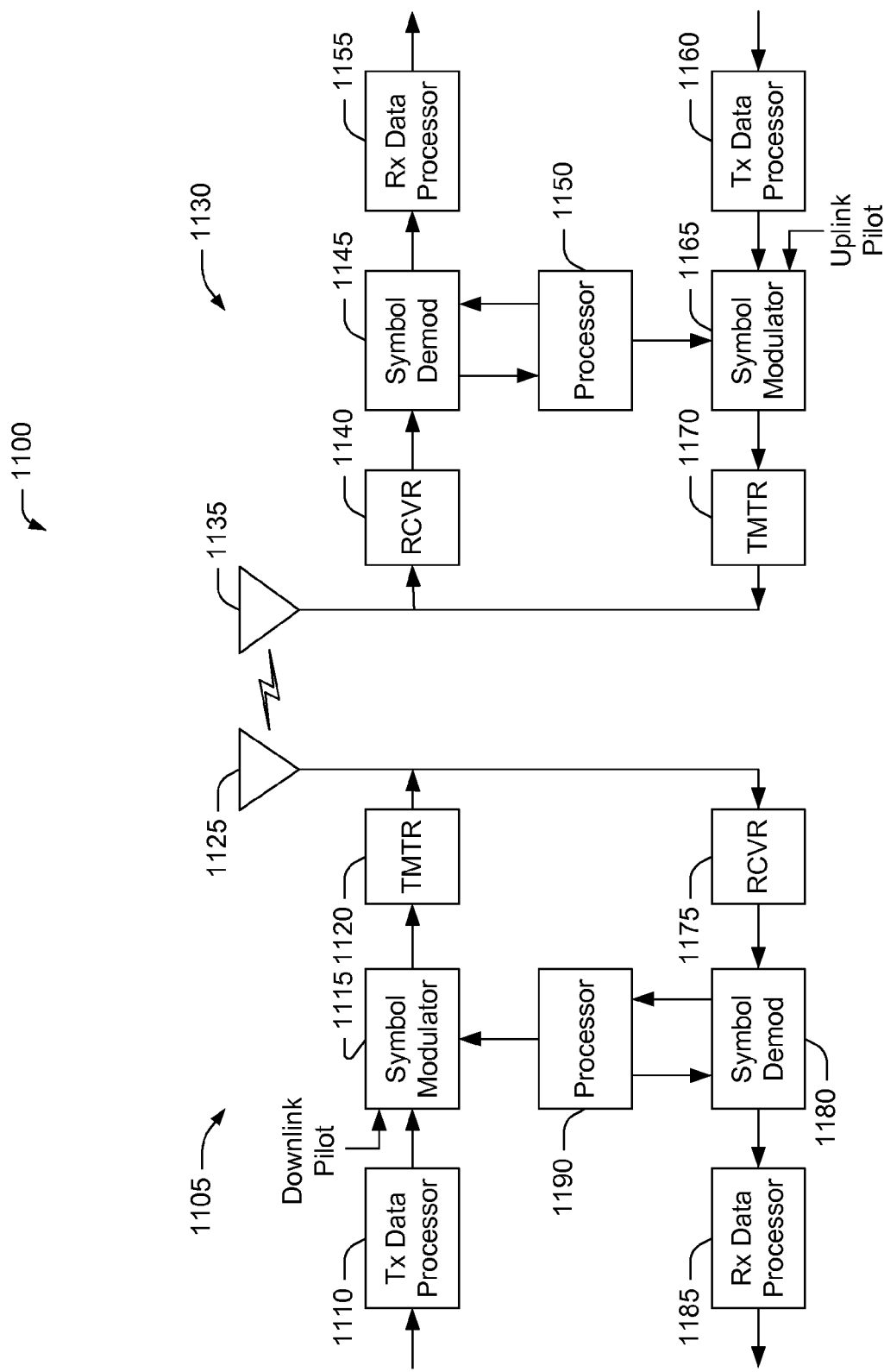
FIG. 11 illustrates a block diagram of an example transmit-receive chain system for wireless communications consistent with at least one aspect.

FIG. 11 depicts a block diagram of an example system 1100 that can facilitate wireless communication according to some aspects disclosed herein. On a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1120 multiplexes data and pilot symbols and provides them to a transmitter unit (TMTR) 1120. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1120 receives and converts the stream of symbols into one or more analog signals and further conditions (e.g. amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105. Specifically, the uplink signal can be in accordance with SC-FDMA requirements and can include frequency hopping mechanisms as described herein.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink.

Multiple terminals can transmit pilot concurrently on the uplink on their respective assigned sets of pilot subbands, where the pilot subband sets can be interlaced.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1190 and 1150.

The systems and apparatuses disclosed herein have been described with respect to interaction between several components, modules and/or communication interfaces. It should be appreciated that such systems and modules can include those modules or sub-modules specified therein, some of the specified modules or sub-modules, and/or additional modules. For example, a system could include AT 902 and HNB 210, or a different combination of these or other modules. Sub-modules could also be implemented as modules communicatively coupled to other modules rather than included within parent modules. Additionally, it should be noted that one or more modules could be combined into a single module providing aggregate functionality. For instance, targeted search module 916 can include sampling module 918, or vice versa, to facilitate frequency search and acquisition for identified active femto cells and infrequent discovery of new femto cells by way of a single component. The components can also interact with one or more other components not specifically described herein but known by those of skill in the art.

Furthermore, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with an AT. An AT can also be called a system, a subscriber unit, a subscriber station, mobile station, mobile, mobile communication device, mobile device, remote station, remote terminal, user terminal (UT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described herein, methodologies that may be implemented in accordance with the disclosed subject matter are also provided. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wireless communication, comprising:
a receive chain configured to receive a wireless communication signal and configured to produce an output signal from a wireless spectrum portion of the wireless communication signal when activated;
a signal processor coupled to the receive chain to receive the output signal and to produce a processed signal set; and
a controller coupled to the receive chain and the signal processor and configured to sample the wireless spectrum portion, wherein the wireless spectrum portion comprises a carrier being monitored and at least one other carrier at which one or more non-macro cells are deployed, by activating the receive chain and by employing the signal processor to search the processed signal set for a target non-macro cell pilot.

2. The apparatus of claim 1, wherein the controller is configured to activate the receive chain and to employ the signal processor to search for the target non-macro cell pilot during a paging cycle wake slot.

3. The apparatus of claim 1, further comprising a targeted search module configured to cause the controller to sample the wireless spectrum portion and search the processed signal set at a time specified by a non-macro cell acquisition latency goal.

4. The apparatus of claim 3, wherein:
the controller is configured to extract a macro identifier from the carrier being monitored; and
the targeted search module is configured to trigger the sampling and search if the target non-macro cell pilot is associated with the macro identifier.

5. The apparatus of claim 1, further comprising a data store configured to store a set of target non-macro cell pilot identifiers associated with the apparatus.

6. The apparatus of claim 5, wherein the data store maintains data that correlates respective identifiers of the set with a macro cell identifier.

7. The apparatus of claim 5, wherein the data store maintains a set of permissible non-macro cell pilot identifiers for a serving wireless network.

8. The apparatus of claim 1, further comprising a sampling module configured to cause the controller to search the processed signal set for permissible non-macro cell pilot identifiers at a non-macro sampling time.

9. The apparatus of claim 8, wherein:
the sampling module is configured to identify a set of active non-macro cell pilot signals from the permissible non-macro cell pilot identifiers; to determine a correlation of the set of active pilot signals with a set of target non-macro cell identifiers; and to update a set of active target non-macro cells based on the correlation,
wherein the target non-macro cell pilot is a member of the set of active target non-macro cells.

10. The apparatus of claim 1, wherein the controller is configured to search a portion of the processed signal set that corresponds to the carrier at which non-macro cells are deployed.

11. The apparatus of claim 1, wherein the controller is further configured to use a portion of the processed signal set that corresponds to the carrier being monitored for a paging analysis operation.

12. A wireless communications apparatus, comprising:
means for employing an antenna to convert a portion of a wireless signal to an electric signal;
means for employing a signal processor to transform the electric signal into a processed symbol set; and
means for employing a data processor to analyze the processed symbol set and extract macro cell paging information pertinent to the apparatus from one carrier of the wireless signal and to extract information indicating presence of a target non-macro cell from another carrier of the wireless signal.

13. The apparatus of claim 12, wherein the processed symbol set analyzed by the data processor corresponds to a common wireless signal frame.

14. The apparatus of claim 12, wherein a low power access point operates at a given carrier frequency within a frequency block and macro cellular frequencies are distributed within a frequency range excluding the given carrier frequency.

15. A computer program product, comprising:
a non-transitory computer-readable medium, comprising:
a first set of codes for causing a computer to sample a wireless spectrum portion comprising a macro cell carrier and at least one carrier where non-macro cells are deployed to obtain a sampled portion;
a second set of codes for causing the computer to process the sampled portion to produce a processed signal set from the wireless spectrum portion;
a third set of codes for causing the computer to search a portion of the processed signal set that corresponds to the non-macro cell carrier frequency of deployment for at least one target non-macro cell pilot; and
a fourth set of codes for causing the computer to employ a portion of the processed signal set that corresponds to the macro cell carrier for a paging monitoring operation.

16. The computer program product of claim 15, wherein the third set of codes are executed during a wake cycle paging slot.

17. A method of integrating non-macro cell search with macro cellular paging monitoring comprising:
employing a wireless receiver to produce an output signal from a wireless spectrum comprising a macro cell carrier and at least one carrier where non-macro cells are deployed;
employing a data processor to execute the following computer-executable instructions:
decode the output signal to produce a processed signal set;
search a portion of the processed signal set that corresponds to the at least one carrier where non-macro cells are deployed for a target non-macro cell pilot; and
evaluate a portion of the processed signal set that corresponds to the macro cell carrier for a paging monitoring operation.

18. The method of claim 17, wherein searching the portion of the processed signal set that corresponds to the at least one carrier where non-macro cells are deployed occurs during a wake cycle paging slot.

19. The method of claim 18, wherein searching the portion of the processed signal set that corresponds to the at least one carrier where non-macro cells are deployed occurs in a subset of wake cycle paging slots scheduled by a serving wireless network.

20. The method of claim 17, further comprising storing a set of non-macro cell pilot identifiers operating within a particular macro coverage area.

21. The method of claim 20, further comprising searching for active non-macro cells within the particular macro coverage area by correlating the set of non-macro cell pilot identifiers to the portion of the processed signal that corresponds to the at least one carrier where non-macro cells are deployed.

22. The method of claim 21, wherein searching for active non-macro cells comprises employing the wireless receiver to produce a current processed signal set, or utilizing a saved processed signal set.

23. The method of claim 22, further comprising searching the saved processed signal set for distinct subsets of the active non-macro cells at different search periods.

24. The method of claim 17, further comprising:
aggregating a bandwidth of the macro cell carrier, the at least one carrier where non-macro cells are deployed and carriers between the macro cell carrier and the at least one carrier where non-macro cells are deployed, to obtain an aggregated bandwidth;
comparing the aggregated bandwidth to an analog to digital conversion rate of the wireless receiver or data processor.

25. The method of claim 24, further comprising employing the wireless receiver to tune to the at least one carrier where non-macro cells are deployed to produce part of the processed signal set and re-tune to the macro cell carrier to produce another part of the processed signal set if the aggregated bandwidth is larger than the analog to digital conversion rate.

26. The method of claim 24, wherein the wireless receiver is tuned to the at least one carrier where non-macro cells are deployed outside of a cycle paging slot for the macro cell carrier.

* * * * *